P. S. OSSER.
TRANSMISSION GEARING.
APPLICATION FILED SEPT. 21, 1915. RENEWED JAN. 13, 1917.

1,236,749.

Patented Aug. 14, 1917.
2 SHEETS—SHEET 1.

Witnesses
H. H. Lybrand
P. M. Smith

Inventor
Percy S. Osser
By Victor J. Evans
Attorney

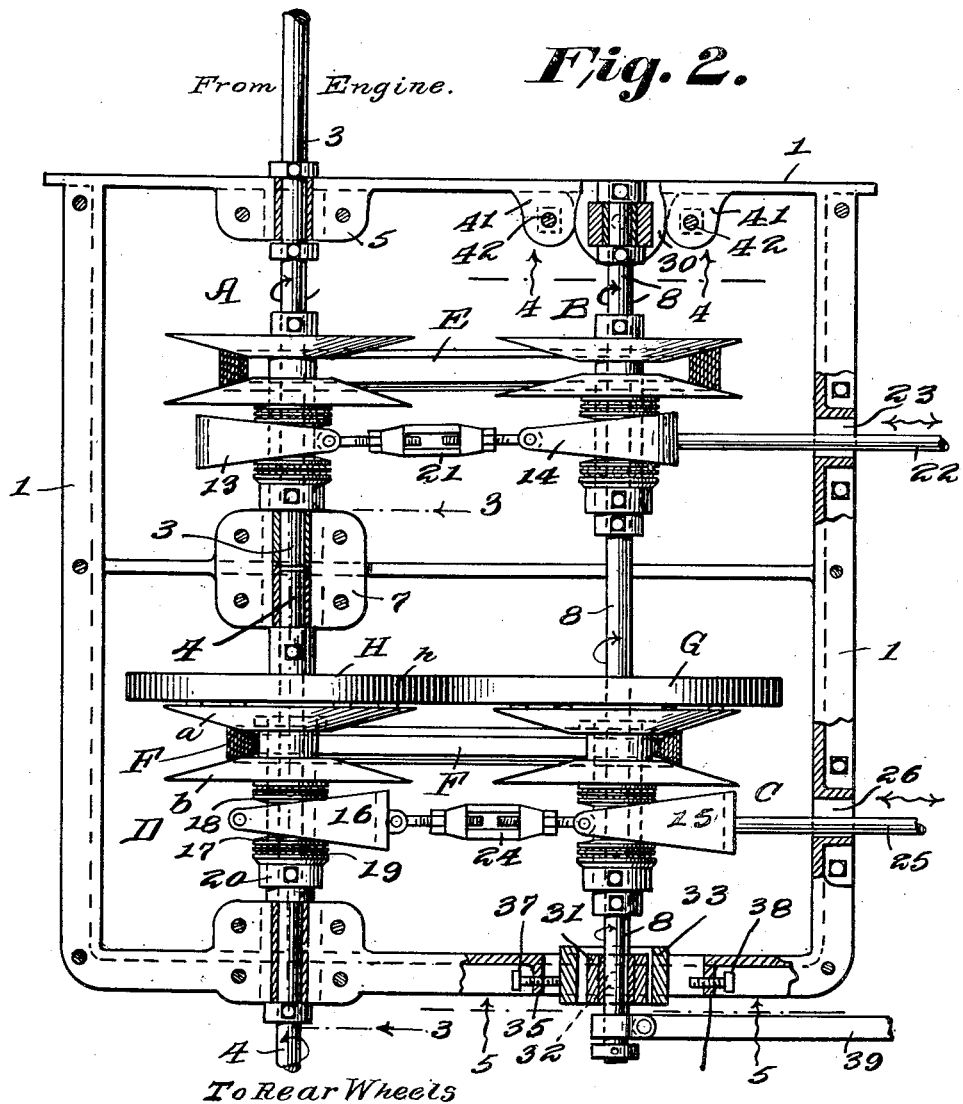
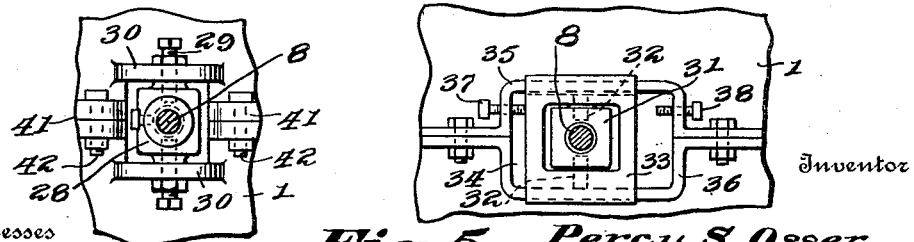

UNITED STATES PATENT OFFICE.

PERCY S. OSSER, OF DETROIT, MICHIGAN, ASSIGNOR, BY DIRECT AND MESNE ASSIGNMENTS, OF PART INTEREST TO CHARLES W. COPPOCK, ELMORE H. POINTER, JEREMIAH WILFRED HEFFAMAN, AND ROBERT McDERMOTT, ALL OF EDMONTON, ALBERTA, CANADA, AND HECTOR M. CLARK, OF HORSE HILLS, ALBERTA, CANADA.

TRANSMISSION-GEARING.

1,236,749.  Specification of Letters Patent.   Patented Aug. 14, 1917.

Application filed September 21, 1915, Serial No. 51,805. Renewed January 13, 1917. Serial No. 142,286.

*To all whom it may concern:*

Be it known that I, PERCY S. OSSER, a subject of the King of Great Britain, residing at Detroit, in the county of Wayne and State of Michigan, have invented new and useful Improvements in Transmission-Gearing, of which the following is a specification.

This invention relates to transmission gearing and while especially designed for use in automobiles and other motor propelled vehicles, it will be apparent as the description proceeds that the transmission gearing of this invention which is of the variable speed and reversible type may be used in many other places and connections with equal advantage and in all kinds of machinery wherein it is desirable or necessary to change the ratio of speed between a driving shaft and a driven shaft or reverse the direction of rotation of the driven shaft in relation to the driving shaft.

A further object of this invention is to provide means for compensating for wear between the working parts of the power and speed transmitting elements and also to provide means whereby the adjusting means or devices may themselves be adjusted or regulated as wear takes place between the working parts of the mechanism. In addition to this provision is made for throwing the mechanism into neutral position for the purpose of entirely disconnecting the driven shaft from the driving shaft either when the parts are in position for driving the driven shaft in the same direction as the driving shaft or in a reverse direction.

With the above and other objects in view, the invention consists in the novel construction, combination and arrangement of parts, as herein described, illustrated and claimed.

In the accompanying drawings:—

Fig. 2 is a similar view showing the relation of the parts when in position for low speed reverse.

Fig. 4 is a section on the line 4—4 of Fig. 2.

Fig. 5 is a section on the line 5—5 of Fig. 2.

Figure 1:
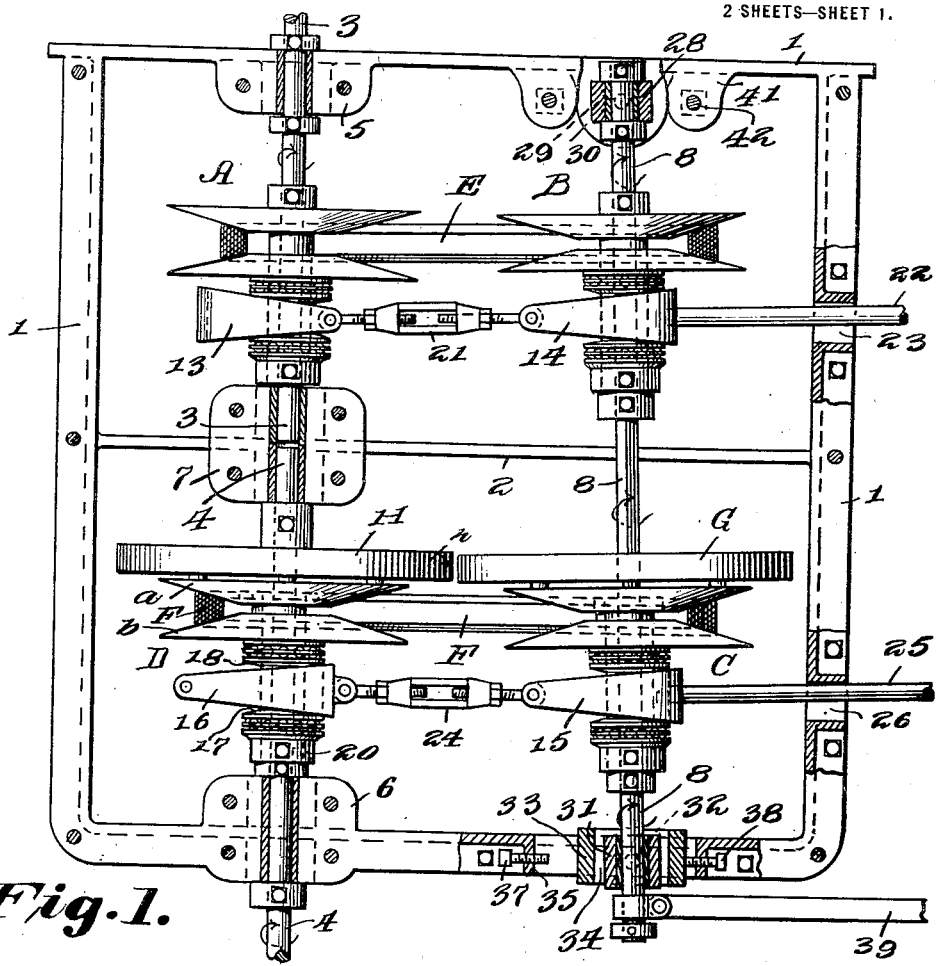
Figure 1 is a plan view partly in section of the transmission gearing of this invention showing the transmission frame, the parts being shown in position for low speed ahead.

Referring to the drawings 1 designates the supporting frame of the transmission gearing the same being illustrated as substantially rectangular in its formation and also as embodying a centrally arranged cross bar or brace 2.

3 designates the driving shaft and 4 the driven shaft, said shafts being arranged end to end and in longitudinal alinement with each other, the same being supported in bearings 5 and 6 at opposite sides or ends of the frame 1 and the adjacent ends thereof being supported in a bearing 7 connected to the cross bar or brace 2.

8 designates a countershaft which is in one piece from end to end, being journaled adjacent to its opposite ends in bearings to be hereinafter more particularly described. An expansion pulley or wheel A is mounted on the driving shaft 3 and in line therewith another expansion pulley B is mounted on the countershaft 8. The countershaft 8 also has mounted thereon another expansion pulley C in line with a fourth expansion pulley D on the driven shaft 4. As all of these expansion pulleys or wheels are of the same construction, a detailed explanation of one will answer for all.

Figure 3:
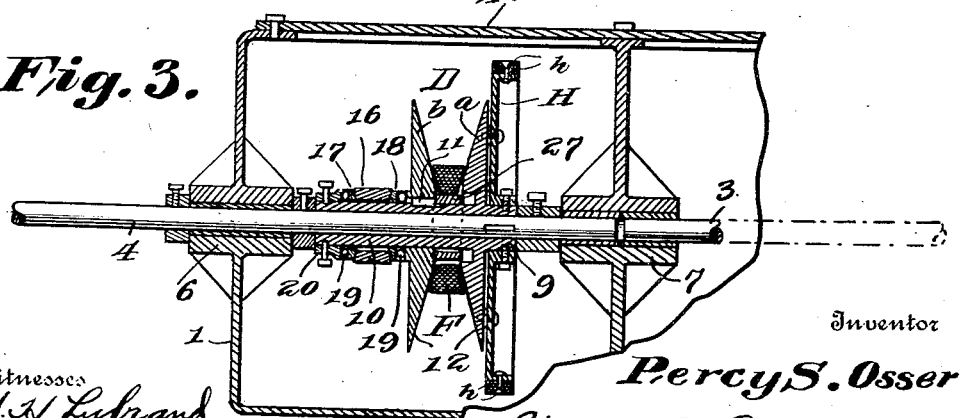
Fig. 3 is a section on the line 3—3 of Fig. 2.

The expansion pulley D as illustrated in section in Fig. 3, comprises two sections *a* and *b*. One of these sections, for example the section *a*, has its hub 9 extended in the form of a sleeve 10 which passes through the center of the other pulley section *b*, the last named section being keyed to the sleeve 10 as shown at 11 but adapted to slide toward and away from the section *a*. The inner adjacent working faces 12 of the sections *a* and *b* are beveled or oblique so as to form inwardly converging annular channels between said sections, the distance between the working faces 12 varying as the sections move toward and away from each other.

In connection with each of the expansion pulleys A, B, C and D I employ means for contracting said pulleys, the said means being shown in the form of wedge-like members 13, 14, 15 and 16. The wedge-like member 16 is shown in Fig. 3 as embracing the sleeve 10 and working between a pair of thrust rings 17 and 18, circular series of anti-friction balls 19 being interposed between one of said thrust rings 17 and a collar 20 fastened to the sleeve 10, the other series of balls being interposed between the slidable ring 18 and the hub of the adjacent member *b* of the expansion pulley D. Therefore, as the wedge-like member is moved in one direction, the pulley section *b* is advanced toward the pulley section *a* and when said wedge-like member is shifted in the opposite direction, the section *b* is allowed to recede from the section *a*.

A driving belt E extends from the pulley A around the pulley B and another driving belt F extends from the pulley C around the pulley D. Under the arrangement illustrated in Fig. 1, the pulley A through the medium of the belt E drives the pulley B and therefore the countershaft 8 in the same direction as the driving shaft 3, and the pulley C through the medium of the belt F drives the pulley D in the same direction. Therefore the driven shaft 4 is turned in the same direction as the driving shaft 3. Each of the belts E and F is of the V-type in cross section and moves inwardly toward the center of a pulley or outwardly toward the periphery thereof in accordance with the space between the working faces of the pulley which space is controlled by the means hereinabove described. It will be noted that the wedge-like members 13 and 14 are reversely disposed in relation to each other and that they are connected by a turn buckle 21 enabling the distance between the members 13 and 14 to be adjusted and regulated and also causing both of said members 13 and 14 to move in the same direction, both members being simultaneously actuated by means of a suitable manually controlled connection 22 shown in the form of a pull and push rod, the same extending through an opening 23 in the casing to a suitable point of operation. It will also be noted that as the member 14 is moved to the right in Fig. 1 to effect an expansion of the pulley B, the wedge-like member 13 is simultaneously moved in the same direction to cause a contraction of the pulley A. This may be done while the mechanism is in operation as the belt E is also in operation and therefore automatically shifts itself outwardly toward the periphery of one expansion pulley and inwardly toward the center of the other expansion pulley.

The wedge-like members 15 and 16 it will be noted are disposed in the same direction and are also connected by a turn buckle 24 having the same purpose and function as the turn buckle 21 and are simultaneously operated by a connection 25 having the same function as the connection 22 and working through an opening 26 in the frame. When the members 15 and 16 are moved to the right in Fig. 1, they allow both of the pulleys C and D to expand and this allows the belt F to become slack in relation to both pulleys and rest against bearing collars 27 loose on their respective shafts, one of said collars being illustrated in cross section in Fig. 3 with the belt F resting in contact therewith. Under the arrangement described, there is no driving action from the shaft 8 to the driven shaft 4 and therefore the shaft 4 remains idle or at rest. When the members 15 and 16 are thrust toward the left in Fig. 1, they contract the pulleys C and D and cause the belt F to be gradually taken up and driven by the pulley C so as to transmit the motion of the shaft 8 to the driven shaft 4.

In order to provide for reversing the direction of rotation of the shaft 4 while the driving shaft 3 is revolving in the same direction as indicated by the arrow in Figs. 1 and 2 the countershaft 8 has fast thereon a wheel G which is movable into and out of driving engagement with a similar wheel H fast on the driven shaft 4. Each of said wheels G and H is preferably constructed as shown in Fig. 3 and provided with a friction face *h* of any suitable material. In order to throw the wheel G into and out of engagement with the wheel H, the shaft 8 is mounted at one end in a bearing 28 which is supported by oppositely located bearing pins or screws 29 threaded through lugs 30 on the frame 1. The opposite end of the shaft 8 is mounted in a bearing 31 which is pivotally mounted at 32 in a sliding support 33 movable lengthwise of a guide way 34 shown as consisting of flanges 35 and 36 projecting from the frame 1. The throw of the sliding support 33 is regulated and limited by means of set screws 37 and 38 inserted through one of the guide flanges just described. Any suitable connection 39 may be employed for shifting the free end of the countershaft 8 so as to throw the wheel G into and out of engagement with the wheel H. The relation of the parts for reversing the direction of rotation of the shaft 4 is illustrated in Fig. 2 where the wheels G and H are in driving contact with each other and the belt F is slack. The direction of rotation of the shafts 3, 4 and 8 is indicated by arrows in said Fig. 2, the shafts 3 and 8 being driven in the same direction and the shaft 4 being driven in the reverse direction. Under either of the arrangements shown in Figs. 1 and 2, the speed of rotation of the shaft 4 may be changed by manipulating the operating connection 22 as the wedge-like members 13 and 14 govern the relative speeds of the expansion pulleys A and B, the ratio between the shafts 3 and 4 depending solely upon the operation of the members 13 and 14.

In the preferred embodiment of the invention, the frame 1 will be made in the form of a casing as indicated in Fig. 3 wherein it is illustrated as being provided with a removable cover or plate 40, the transmission gearing being thus wholly inclosed and protected and the casing being also adapted to contain lubricant for the working elements of the transmission gearing. Furthermore, as indicated in Figs. 4 and 5, the frame when in the form of an inclosing casing is also by preference divided along the line 41 into upper and lower sections fastened together by bolts 42 or their equivalent to assist in the assemblage of the complete structure and to give accessibility to the various parts of the mechanism for repair or renewal purposes.

From the foregoing description taken in connection with the accompanying drawings, the operation of the mechanism hereinabove described will now be readily understood. In Fig. 1, the parts are shown in what is known as low speed position, the belt E engaging the pulley A near the inner periphery of the working faces thereof and engaging the pulley B nearer the outer periphery of the working faces thereof. In order to increase the speed, the wedge-like members 13, 14 are shifted to the right in Fig. 1 thereby contracting the pulley A while permitting the pulley B to expand. This movement may be continued until the belt E engages the outer margin of the working faces of the pulley A and the inner margin of the working faces of the pulley B. Thus the speed of the countershaft 8 is gradually increased as compared with the speed of the driving shaft 3. When the members 15 and 16 are thrust to the left in Fig. 1, the belt F is engaged and driven and transmits the motion of the shaft 8 to the driven shaft 4. By shifting the members 15 and 16 to the right in Fig. 1, the driving engagement between the shafts 8 and 4 is released or broken enabling the machine to be brought to a stop. In order to reverse the direction of rotation of the shaft 4, the connection 39 is manipulated so as to throw the wheel G against the wheel H, the belt F having been previously thrown out of operation by shifting the connection 25 to the right. This enables a variety of speeds to be obtained both in a forward and reverse direction.

Having thus described my invention, I claim:—

1. In transmission gearing, a driving shaft, a driven shaft, a countershaft substantially parallel to the driving and driven shafts, expansion pulleys mounted on the driving shaft and countershaft to rotate therewith, a belt passing around said pulleys, means by the operation of which one of said pulleys is caused to contract while the other expands, said means embodying connected and simultaneously shiftable wedge-like members which exert a thrust against one side of said pulleys, other driving means between the countershaft and driven shaft, and means for adjusting the distance between said wedge-like members.

2. In transmission gearing, a driving shaft, a driven shaft, a countershaft substantially parallel to the driving and driven shafts, expansion pulleys mounted on the driving shaft and countershaft to rotate therewith, a belt passing around said pulleys, means by the operation of which one of said pulleys is caused to contract while the other expands, said means embodying connected and simultaneously shiftable reversely disposed wedge-like members which exert a thrust against one side of said pulleys, take-up means between said wedge-like members, other expansion pulleys on the countershaft and driven shaft, connected and simultaneously shiftable wedge-like members facing in the same direction and acting to simultaneously expand the last named pulleys, and take-up means between the last named members.

3. In transmission gearing, a driving shaft, a driven shaft, a countershaft substantially parallel to the driving and driven shafts, expansion pulleys mounted on the driving shaft and countershaft to rotate therewith, a belt passing around said pulleys, means by the operation of which one of said pulleys is caused to contract while the other expands, other driving means between the countershaft and driven shaft, the last named means comprising other expansion pulleys mounted to revolve with the countershaft and driven shaft, a belt connecting said pulleys, means for causing the simultaneous contraction or expansion of the last named pulleys, coöperating reversing gears on the countershaft and driven shaft, one end only of the countershaft being mounted for lateral shifting movement to throw said gears into and out of driving engagement, swiveled bearings in which the end portions of the countershaft are journaled, and a sliding support for the bearing at the shiftable end of said countershaft.

In testimony whereof I affix my signature in presence of two witnesses.

PERCY S. OSSER.

Witnesses:
JOHN WAGNER,
H. C. PARKER.